United States Patent
Chhabra et al.

(10) Patent No.: US 12,211,195 B2
(45) Date of Patent: Jan. 28, 2025

(54) EDGE DEFECT DETECTION VIA IMAGE ANALYTICS

(71) Applicant: Applied Materials, Inc., Santa Clara, CA (US)

(72) Inventors: Yash Chhabra, Bangalore (IN); Abyaya Dhar, Bangalore (IN); Joseph Liu, Zhubei (TW); Yi Nung Wu, Taoyuan (TW); Boon Sen Chan, Singapore (SG); Sidda Reddy Kurakula, Bengaluru (IN); Chandrasekhar Roy, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 203 days.

(21) Appl. No.: 17/949,937

(22) Filed: Sep. 21, 2022

(65) Prior Publication Data
US 2024/0095899 A1  Mar. 21, 2024

(51) Int. Cl.
*G06T 7/00* (2017.01)
*G01N 21/95* (2006.01)

(52) U.S. Cl.
CPC ....... *G06T 7/0004* (2013.01); *G01N 21/9501* (2013.01); *G06T 2207/20081* (2013.01); *G06T 2207/20084* (2013.01); *G06T 2207/30148* (2013.01)

(58) Field of Classification Search
CPC ...... G01N 21/9501; G06T 2207/20081; G06T 2207/20084; G06T 2207/30148; G06T 7/0004; G03F 7/707
See application file for complete search history.

(56) References Cited

U.S. PATENT DOCUMENTS

| | | | |
|---|---|---|---|
| 2007/0269099 A1* | 11/2007 | Nishino | G06T 7/0004 382/141 |
| 2012/0075460 A1 | 3/2012 | Aikawa et al. | |
| 2017/0045577 A1* | 2/2017 | Ding | G01R 31/2891 |
| 2019/0244842 A1 | 8/2019 | Ravid et al. | |
| 2019/0252213 A1* | 8/2019 | Koizumi | C25D 17/001 |
| 2020/0372630 A1 | 11/2020 | Haque et al. | |
| 2020/0381273 A1 | 12/2020 | Shigemasu et al. | |
| 2022/0262658 A1 | 8/2022 | Cong et al. | |

FOREIGN PATENT DOCUMENTS

| | | |
|---|---|---|
| CN | 110323148 | 10/2019 |
| KR | 20080069694 A | 7/2008 |
| KR | 20120066151 A | 6/2012 |
| KR | 20160081439 A | 7/2016 |

OTHER PUBLICATIONS

International Search Report and Written Opinion for International Application No. PCT/US2023/033182, mailed Jan. 16, 2024, 9 Pages.

* cited by examiner

*Primary Examiner* — Peter B Kim
(74) *Attorney, Agent, or Firm* — Lowenstein Sandler LLP

(57) ABSTRACT

The present disclosure includes edge defect detection via image analytics. A method includes identifying an image of an edge of a susceptor pocket formed by a susceptor of a substrate processing system. The method further includes predicting, based on the image, whether property values of the edge of the susceptor pocket meet threshold values. The method further includes, responsive to the property values of the edge meeting threshold values, causing performance of a corrective action associated with the susceptor.

17 Claims, 9 Drawing Sheets

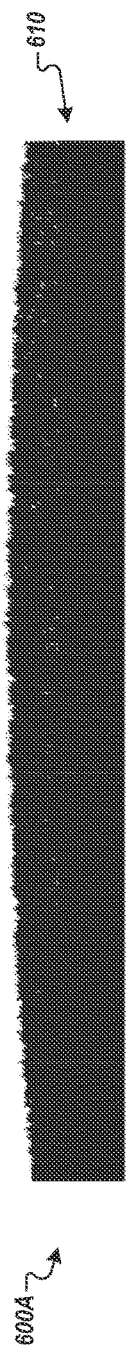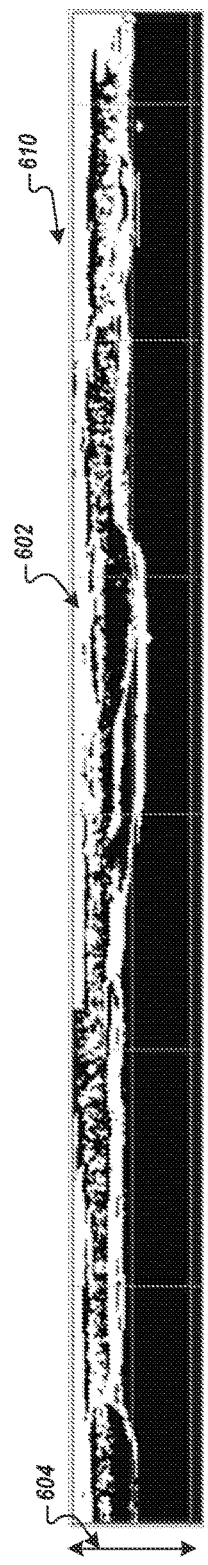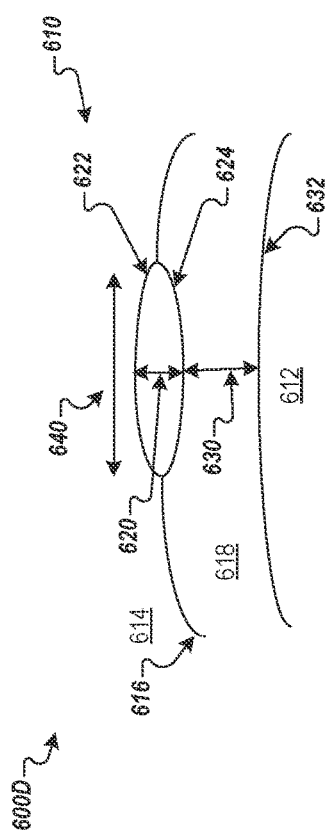

EDGE DEFECT DETECTION VIA IMAGE ANALYTICS

TECHNICAL FIELD

The present disclosure relates to image analytics, and, more particularly, edge defect detection via image analytics.

BACKGROUND

Manufacturing equipment include different parts that are used to produce products. For example, substrate processing equipment includes parts that are used to produce substrates (e.g., process substrates). The quality and cleanliness of the parts affects the performance data of the products.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying an image of an edge of a susceptor pocket formed by a susceptor of a substrate processing system. The method further includes predicting, based on the image, whether property values of the edge of the susceptor meet threshold values. The method further includes, responsive to the property values of the edge meeting threshold values, causing performance of a corrective action associated with the susceptor.

In another aspect of the disclosure, a non-transitory computer-readable storage medium storing instructions which, when executed, cause a processing device to perform operations. The operations include identifying an image of an edge of a susceptor pocket formed by a susceptor of a substrate processing system. The operations further include predicting, based on the image, whether property values of the edge of the susceptor meet threshold values. The operations further include, responsive to the property values of the edge meeting threshold values, causing performance of a corrective action associated with the susceptor.

In another aspect of the disclosure, a system includes a memory and a processing device coupled to the memory. The processing device is to identify an image of an edge of a susceptor pocket formed by a susceptor of a substrate processing system. The processing device is further to predict, based on the image, whether property values of the edge of the susceptor meet threshold values. The processing device is further to, responsive to the property values of the edge meeting threshold values, causing performance of a corrective action associated with the susceptor.

BRIEF DESCRIPTION OF THE DRAWINGS

The present disclosure is illustrated by way of example, and not by way of limitation in the figures of the accompanying drawings.

FIGS. 6A-D illustrate images of substrate processing equipment parts, according to certain embodiments.

DETAILED DESCRIPTION

Figure 1:
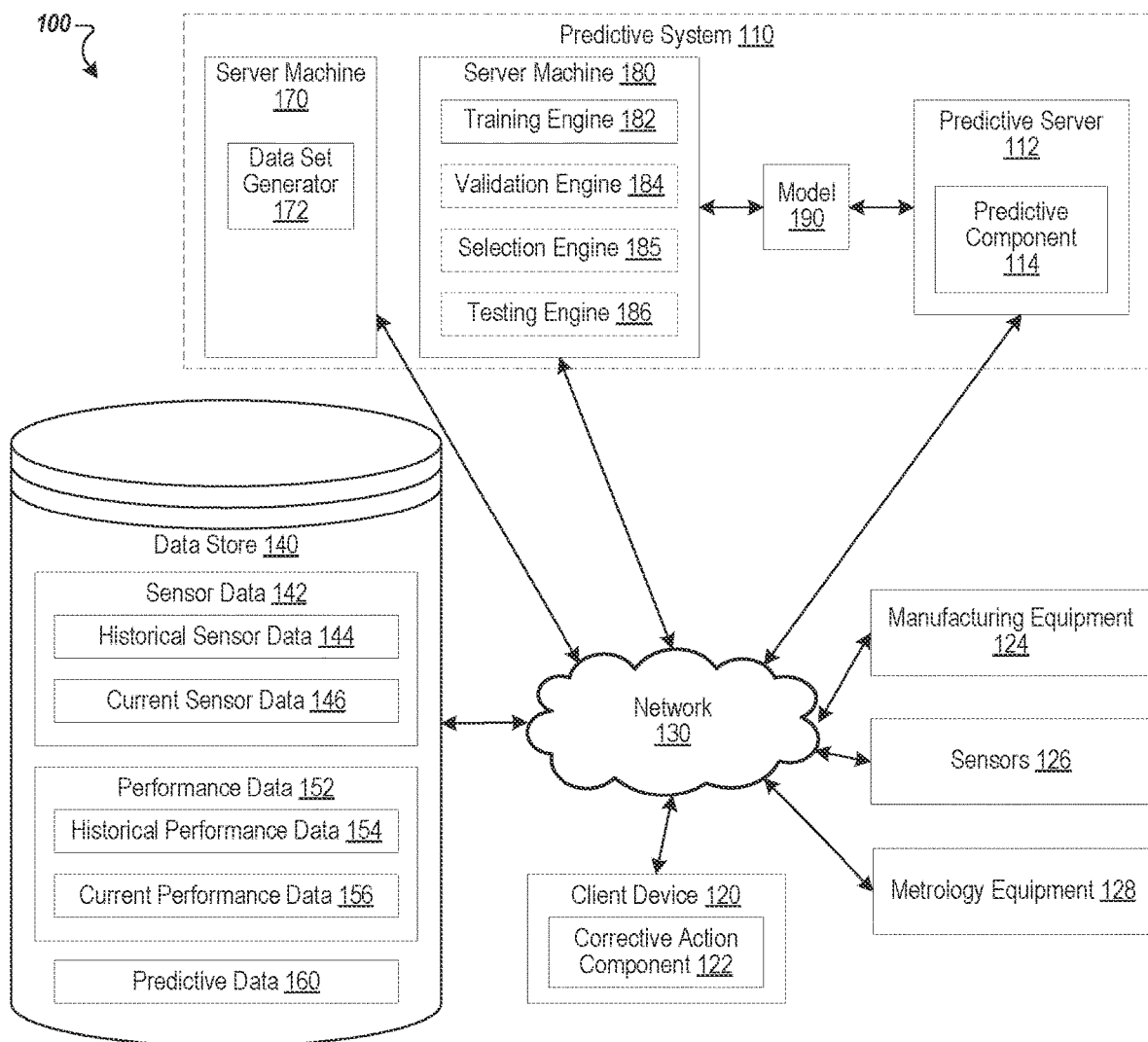
FIG. 1 is a block diagram illustrating an exemplary system architecture, according to certain embodiments.

Described herein are technologies directed to edge defect detection via image analytics (e.g., automated quality control check for susceptor edge, detecting wafer pocket edge defects in susceptor using image analytics).

Manufacturing equipment include different parts that are used to produce products. For example, substrate processing equipment includes parts that are used to produce substrates (e.g., process substrates). Some parts, such as susceptors form edges (e.g., pocket edges formed on upper surface of the susceptor). The quality and cleanliness of the parts affects the performance data of the products. For example, a susceptor that has pocket edges that are damaged or have buildup can cause substrates to be produced with performance data that does not meet threshold values (e.g., produce bad wafers).

In some conventional systems, parts are manually inspected to attempt to determine if the parts meet quality and cleanliness to produce substrates that have performance data that will meet threshold values. Manual inspection takes a lot of time, depends on the user that is performing the inspection, and can be inaccurate. Inaccuracy in manual inspection can lead to using faulty parts or prematurely replacing parts.

In some conventional systems, intervals are scheduled for performance of maintenance operations (e.g., cleaning operations, repairing operations, replacement operations) of parts. The intervals are set to attempt to keep the parts in a condition to produce substrates that have performance data that will meet threshold values (e.g., clean, repair, and replace parts before the parts produce bad wafers). Over time, parts become damaged, parts wear down, parts develop buildup of foreign material, etc. that may not occur at set intervals (e.g., occur before or after the set intervals). The premature repair or replacement of a part is wasteful, takes time, lower throughput, interruption of production, etc. Overdue repair or replacement of a part causes production of substrates that have performance data that does not meet threshold values, damage of equipment, etc.

The devices, systems, and methods disclosed herein provide edge defect detection via image analytics.

A processing device identifies an image of an edge of a substrate processing equipment part (e.g., susceptor). The image may be captured of a substantially horizontal upper surface of a susceptor. The susceptor may form one or more recesses (e.g., susceptor pockets). The susceptor may include an upper surface that forms one or more recesses (e.g., susceptor pockets). The recesses may be further formed by one or more sidewalls (e.g., substantially vertical sidewall) and a lower surface. Where the upper surface and the sidewall of the recess meet is an edge (e.g., upper edge). The susceptor pocket may be configured to receive a substrate for performance of a substrate processing operation. The edge may have defects over time (e.g., from placing and removing substrates in the susceptor pocket).

The processing device predicts, based on the image, whether property values of the edge of the susceptor meet threshold values.

In some embodiments, the processing device determines, based on the image, at least one of a height of a portion of the image associated with the edge or a quantity of pixels associated with an edge crack. An edge that has buildup or that is damaged (e.g., cracked) may have a height that meets a threshold value in the image (e.g., is greater than a height in the image of a susceptor that produces good wafers). An edge that is damaged (e.g., cracked) may have a quantity of pixels associated with an edge crack (e.g., white pixels) that meets a threshold value (e.g., greater than a number of white pixels in an image of a susceptor that produces good wafers).

In some embodiments, the image is provided to a trained machine learning model and output associated with predictive data is received from the machine learning model.

Responsive to the property values of the edge meeting threshold values (e.g., the height of the edge meeting a threshold height, the quantity of pixels meeting a threshold amount, the predictive data indicating the property values meet the threshold values), the processing device causes performance of a corrective action associated with the substrate processing equipment part. The corrective action may include providing an alert, causing a cleaning process, causing a repair process, causing the substrate processing equipment part to be replaced, causing further inspection, and/or the like.

Aspects of the present disclosure result in technological advantages. The present disclosure avoids the time, inaccuracies, and subjectivity of conventional manual inspection. The present disclosure causes corrective action associated with substrate processing equipment parts to produce substrates that meet threshold values, avoid damage of equipment, increase throughput, avoid interruption of production, etc.

Some embodiments of the present disclosure describe performing edge defect detection of susceptors. In some embodiments, the present disclosure can be used to perform edge defect detection for other parts (e.g., substrate processing equipment parts), such as electrostatic chucks, edge rings, etc.

Some embodiments of the present disclosure describe performing edge defect detection of susceptor pockets formed by susceptors (e.g., recesses formed by parts). In some embodiments, the present disclosure can be used to perform edge defect detection of other portions of parts (e.g., substrate processing equipment parts), such as an outer perimeter edge, a mesa, etc.

Some embodiments of the present disclosure describe performing edge defect detection of edges that are substantially vertical and form a circular shape (e.g., a circular recess in a susceptor). In some embodiments, the present disclosure can be used to perform edge defect detection of other types of edges, such as edges that are not substantially vertical, edges that do not form a circular shape (e.g., edges that form a rectangular shape, a triangular shape, a ovular shape, etc.).

As used herein, the term "produce" can refer to producing a final version of a product (e.g., completely processed substrate) or an intermediary version of a product (e.g., partially processed substrate). As used herein, the producing substrates can refer to processing substrates via performance of one or more substrate processing operations.

FIG. 1 is a block diagram illustrating an exemplary system 100 (exemplary system architecture), according to certain embodiments. The system 100 includes a client device 120, manufacturing equipment 124, sensors 126, metrology equipment 128, a predictive server 112, and a data store 140. In some embodiments, the predictive server 112 is part of a predictive system 110. In some embodiments, the predictive system 110 further includes server machines 170 and 180.

In some embodiments, one or more of the client device 120, manufacturing equipment 124, sensors 126, metrology equipment 128, predictive server 112, data store 140, server machine 170, and/or server machine 180 are coupled to each other via a network 130 for generating predictive data 160 to perform edge defect detection. In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, the client device 120 includes a computing device such as Personal Computers (PCs), laptops, mobile phones, smart phones, tablet computers, netbook computers, etc. In some embodiments, the client device 120 includes a corrective action component 122. In some embodiments, the corrective action component 122 may also be included in the predictive system 110 (e.g., machine learning processing system). In some embodiments, the corrective action component 122 is alternatively included in the predictive system 110 (e.g., instead of being included in client device 120). Client device 120 includes an operating system that allows users to one or more of consolidate, generate, view, or edit data, provide directives to the predictive system 110 (e.g., machine learning processing system), etc.

In some embodiments, corrective action component 122 receives user input (e.g., via a Graphical User Interface (GUI) displayed via the client device 120), receives sensor data 142 from sensors, receives performance data 152 from metrology equipment 128, etc. In some embodiments, the corrective action component 122 transmits the data (e.g., user input, sensor data 142, performance data 152, etc.) to the predictive system 110, receives predictive data 160 from the predictive system 110, determines a corrective action based on the predictive data 160, and causes the corrective action to be implemented. In some embodiments, the corrective action component 122 stores data (e.g., user input, sensor data 142, performance data 152, etc.) in the data store 140 and the predictive server 112 retrieves data from the data store 140. In some embodiments, the predictive server 112 stores output (e.g., predictive data 160) of the trained machine learning model 190 in the data store 140 and the client device 120 retrieves the output from the data store 140. In some embodiments, the corrective action component 122 receives an indication of a corrective action (e.g., based on predictive data 160) from the predictive system 110 and causes performance of the corrective action.

In some embodiments, the predictive data 160 is associated with a corrective action. In some embodiments, a corrective action is associated with one or more of cleaning a substrate processing equipment part, repairing a substrate processing equipment part, replacing a substrate processing equipment part, Computational Process Control (CPC), Statistical Process Control (SPC) (e.g., SPC to compare to a graph of 3-sigma, etc.), Advanced Process Control (APC), model-based process control, preventative operative maintenance, design optimization, updating of manufacturing parameters, feedback control, machine learning modification, or the like. In some embodiments, the corrective action includes providing an alert (e.g., an alarm to not use the substrate processing equipment part or the manufacturing equipment 124 if the predictive data 160 indicates a predicted abnormality, such as an abnormality of the substrate processing equipment part or the product). In some embodiments, the corrective action includes providing feedback control (e.g., cleaning, repairing, and/or replacing the substrate processing equipment part responsive to the predictive data 160 indicating a predicted abnormality). In some embodiments, the corrective action includes providing machine learning (e.g., causing modification of a substrate processing equipment part based on the predictive data 160).

In some embodiments, the predictive server 112, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 includes a predictive component 114. In some embodiments, the predictive component 114 receives sensor data 142 (e.g., receive from the client device 120, retrieve from the data store 140) and generates predictive data 160 associated with edge defect detection. In some embodiments, the predictive component 114 uses one or more trained machine learning models 190 to determine the predictive data 160 for edge defect detection. In some embodiments, trained machine learning model 190 is trained using historical sensor data 144 and historical performance data 154.

In some embodiments, the predictive system 110 (e.g., predictive server 112, predictive component 114) generates predictive data 160 using supervised machine learning (e.g., supervised data set, historical sensor data 144 labeled with historical performance data 154, etc.). In some embodiments, the predictive system 110 generates predictive data 160 using semi-supervised learning (e.g., semi-supervised data set, performance data 152 is a predictive percentage, etc.). In some embodiments, the predictive system 110 generates predictive data 160 using unsupervised machine learning (e.g., unsupervised data set, clustering, clustering based on historical sensor data 144, etc.).

In some embodiments, the manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), auto teach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, the manufacturing equipment 124 includes components of substrate processing systems. In some embodiments, the sensor data 142 include parameters of processes performed by components of the manufacturing equipment 124 (e.g., etching, heating, cooling, transferring, processing, flowing, etc.). In some embodiments, substrate processing equipment parts are a component (e.g., showerhead, susceptor, electrostatic chuck, edge ring, etc.) of the processing chamber.

In some embodiments, the sensors 126 provide sensor data 142 (e.g., sensor values, such as historical sensor values and current sensor values) associated with manufacturing equipment 124. In some embodiments, the sensors 126 include one or more of an imaging sensor (e.g., camera, image capturing device, etc.), a pressure sensor, a temperature sensor, a flow rate sensor, a spectroscopy sensor, and/or the like. In some embodiments, the sensor data 142 used for equipment health and/or product health (e.g., product quality). In some embodiments, the sensor data 142 are received over a period of time.

In some embodiments, sensors 126 provide sensor data 142 such as values of one or more of image data, leak rate, temperature, pressure, flow rate (e.g., gas flow), pumping efficiency, spacing (SP), High Frequency Radio Frequency (HFRF), electrical current, power, voltage, and/or the like.

In some embodiments, the sensor data 142 (e.g., historical sensor data 144, current sensor data 146, etc.) is processed by the client device 120 and/or by the predictive server 112. In some embodiments, processing of the sensor data 142 includes generating features. In some embodiments, the features are a portion of the sensor data (e.g., cropped image), processed image data (e.g., processed image), pattern in the sensor data 142 (e.g., slope, width, height, peak, etc.) or a combination of values from the sensor data 142 (e.g., power derived from voltage and current, etc.). In some embodiments, the sensor data 142 includes features that are used by the predictive component 114 for obtaining predictive data 160.

In some embodiments, the metrology equipment 128 (e.g., imaging equipment, spectroscopy equipment, ellipsometry equipment, etc.) is used to determine metrology data (e.g., inspection data, image data, spectroscopy data, ellipsometry data, material compositional, optical, or structural data, etc.) corresponding to substrates produced by the manufacturing equipment 124 (e.g., substrate processing equipment). In some examples, after the manufacturing equipment 124 processes substrates, the metrology equipment 128 is used to inspect portions (e.g., layers) of the substrates. In some embodiments, the metrology equipment 128 performs scanning acoustic microscopy (SAM), ultrasonic inspection, x-ray inspection, and/or computed tomography (CT) inspection. In some examples, after the manufacturing equipment 124 deposits one or more layers on a substrate, the metrology equipment 128 is used to determine quality of the processed substrate (e.g., thicknesses of the layers, uniformity of the layers, interlayer spacing of the layer, and/or the like). In some embodiments, the metrology equipment 128 includes an image capturing device (e.g., SAM equipment, ultrasonic equipment, x-ray equipment, CT equipment, and/or the like). In some embodiments, performance data 152 includes metrology data from metrology equipment 128.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of sensor data 142, performance data 152, and/or predictive data 160.

Sensor data 142 includes historical sensor data 144 and current sensor data 146. In some embodiments, sensor data 142 may include one or more of image data, pressure data, pressure range, temperature data, temperature range, flow rate data, power data, comparison parameters for comparing inspection data with threshold data, threshold data, cooling rate data, cooling rate range, and/or the like. In some embodiments, at least a portion of the sensor data 142 is from sensors 126.

Performance data 152 includes historical performance data 154 and current performance data 156. Performance data 152 may include property values of a substrate processing equipment part (e.g., susceptor), an indication of whether property values of a substrate processing equipment part (e.g., susceptor) meet threshold values, etc. In some examples, the performance data 152 is indicative of whether a substrate is properly designed, properly produced, and/or properly functioning. In some embodiments, at least a portion of the performance data 152 is associated with a quality of substrates produced by the manufacturing equipment 124. In some embodiments, at least a portion of the performance data 152 is based on metrology data from the metrology equipment 128 (e.g., historical performance data 154 includes metrology data indicating properly processed substrates, property data of substrates, yield, etc.). In some embodiments, at least a portion of the performance data 152 is based on inspection of the substrates (e.g., current performance data 156 based on actual inspection). In some embodiments, the performance data 152 includes an indication of an absolute value (e.g., inspection data of the bond interfaces indicates missing the threshold data by a calculated value, deformation value misses the threshold deformation value by a calculated value) or a relative value (e.g., inspection data of the bond interfaces indicates missing the threshold data by 5%, deformation misses threshold deformation by 5%). In some embodiments, the performance data 152 is indicative of meeting a threshold amount of error (e.g., at least 5% error in production, at least 5% error in flow, at least 5% error in deformation, specification limit).

In some embodiments, the client device 120 provides performance data 152 (e.g., product data). In some examples, the client device 120 provides (e.g., based on user input) performance data 152 that indicates an abnormality in products (e.g., defective products). In some embodiments, the performance data 152 includes an amount of products that have been produced that were normal or abnormal (e.g., 98% normal products). In some embodiments, the performance data 152 indicates an amount of products that are being produced that are predicted as normal or abnormal. In some embodiments, the performance data 152 includes one or more of yield a previous batch of products, average yield, predicted yield, predicted amount of defective or non-defective product, or the like. In some examples, responsive to yield on a first batch of products being 98% (e.g., 98% of the products were normal and 2% were abnormal), the client device 120 provides performance data 152 indicating that the upcoming batch of products is to have a yield of 98%.

In some embodiments, historical data includes one or more of historical sensor data 144 and/or historical performance data 154 (e.g., at least a portion for training the machine learning model 190). Current data includes one or more of current sensor data 146 and/or current performance data 156 (e.g., at least a portion to be input into the trained machine learning model 190 subsequent to training the model 190 using the historical data). In some embodiments, the current data is used for retraining the trained machine learning model 190.

In some embodiments, the predictive data 160 is to be used to cause performance of corrective actions on the substrate processing equipment parts.

Performing metrology on products to determine substrate processing equipment parts that do not meet a threshold quality incorrectly produced components (e.g., bonded metal plate structures) is costly in terms of time used, metrology equipment 128 used, energy consumed, bandwidth used to send the metrology data, processor overhead to process the metrology data, etc. By providing sensor data 142 to model 190 and receiving predictive data 160 from the model 190, system 100 has the technical advantage of avoiding the costly process of using metrology equipment 128 and discarding substrates.

Performing manufacturing processes with substrate processing equipment parts that result in defective products is costly in time, energy, products, substrate processing equipment parts, manufacturing equipment 124, the cost of identifying the substrate processing equipment part causing the defective products, cleaning the substrate processing equipment part, repairing the substrate processing equipment part, replacing the substrate processing equipment part, discarding the old component, etc. By providing sensor data 142 to model 190, receiving predictive data 160 from the model 190, and causing a corrective action based on the predictive data 160, system 100 has the technical advantage of avoiding the cost of producing, identifying, and discarding defective substrates.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. The data set generator 172 has functions of data gathering, compilation, reduction, and/or partitioning to put the data in a form for machine learning. In some embodiments (e.g., for small datasets), partitioning (e.g., explicit partitioning) for post-training validation is not used. Repeated cross-validation (e.g., 5-fold cross-validation, leave-one-out-cross-validation) may be used during training where a given dataset is in-effect repeatedly partitioned into different training and validation sets during training. A model (e.g., the best model, the model with the highest accuracy, etc.) is chosen from vectors of models over automatically-separated combinatoric subsets. In some embodiments, the data set generator 172 may explicitly partition the historical data (e.g., historical sensor data 144 and corresponding historical performance data 154) into a training set (e.g., sixty percent of the historical data), a validating set (e.g., twenty percent of the historical data), and a testing set (e.g., twenty percent of the historical data). In this embodiment, some operations of data set generator 172 are described in detail below with respect to FIGS. 2 and 7A. In some embodiments, the predictive system 110 (e.g., via predictive component 114) generates multiple sets of features (e.g., training features). In some examples a first set of features corresponds to a first set of types of sensor data (e.g., from a first set of sensors, first combination of values from first set of sensors, first patterns in the values from the first set of sensors) that correspond to each of the data sets (e.g., training set, validation set, and testing set) and a second set of features correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of parameters of the training set (e.g., sensor data 142) and corresponding responses (e.g., performance data 152). In some embodiments, multiple models are trained on the same parameters with distinct targets for the purpose of modeling multiple effects. In some examples, a first trained machine learning model was trained using sensor data 142 from all sensors 126 (e.g., sensors 1-5), a second trained machine learning model was trained using a first subset of the sensor data (e.g., from sensors 1, 2, and 4), and a third trained machine learning model was trained using a second subset of the sensor data (e.g., from sensors 1, 3, 4, and 5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 evaluates and flags (e.g., to be discarded) trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 (e.g., used for classification) refers to a model artifact that is created by the training engine 182 using a training set that includes data inputs and corresponding target outputs (e.g. correctly classifies a condition or ordinal level for respective training inputs). Patterns in the data sets can be found that map the data input to the target output (the correct classification or level), and the machine learning model 190 is provided mappings that captures these patterns. In some embodiments, the machine learning model 190 uses one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non probabilistic methods may also be used including one or more of Support Vector Machine (SVM), Radial Basis Function (RBF), clustering, Nearest Neighbor algorithm (k-NN), linear regression, random forest, neural network (e.g., artificial neural network), etc. In some embodiments, the machine learning model 190 is a multivariate analysis (MVA) regression model.

Predictive component 114 provides current sensor data 146 (e.g., as input) to the trained machine learning model 190 and runs the trained machine learning model 190 (e.g., on the input to obtain one or more outputs). The predictive component 114 is capable of determining (e.g., extracting) predictive data 160 from the trained machine learning model 190 and determines (e.g., extracts) uncertainty data that indicates a level of credibility that the predictive data 160 corresponds to current performance data 156. In some embodiments, the predictive component 114 or corrective action component 122 use the uncertainty data (e.g., uncertainty function or acquisition function derived from uncertainty function) to decide whether to use the predictive data 160 to perform a corrective action or whether to further train the model 190.

Figure 2:
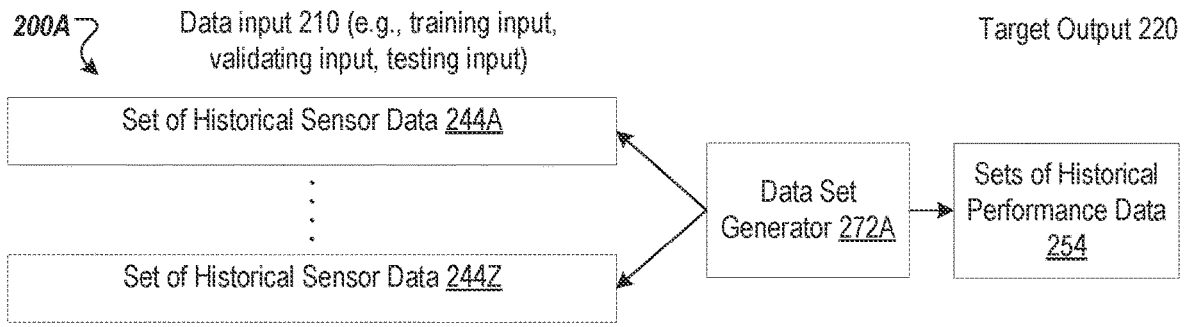
FIG. 2 illustrates a data set generator to create data sets for a machine learning model, according to certain embodiments.

For purpose of illustration, rather than limitation, aspects of the disclosure describe the training of one or more machine learning models 190 using historical data (i.e., prior data, historical sensor data 144 and historical performance data 154) and providing current sensor data 146 into the one or more trained probabilistic machine learning models 190 to determine predictive data 160. In other implementations, a heuristic model or rule-based model is used to determine predictive data 160 (e.g., without using a trained machine learning model). In other implementations non-probabilistic machine learning models may be used. Predictive component 114 monitors historical sensor data 144 and historical performance data 154. In some embodiments, any of the information described with respect to data inputs 210 of FIG. 2 are monitored or otherwise used in the heuristic or rule-based model.

In some embodiments, the functions of client device 120, predictive server 112, server machine 170, and server machine 180 are be provided by a fewer number of machines. For example, in some embodiments, server machines 170 and 180 are integrated into a single machine, while in some other embodiments, server machine 170, server machine 180, and predictive server 112 are integrated into a single machine. In some embodiments, client device 120 and predictive server 112 are integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 determines corrective actions based on the predictive data 160. In another example, client device 120 determines the predictive data 160 based on data received from the trained machine learning model.

In addition, the functions of a particular component can be performed by different or multiple components operating together. In some embodiments, one or more of the predictive server 112, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of determining predictive data 160 for edge defect detection of substrate processing equipment parts in manufacturing facilities (e.g., substrate processing facilities), in some embodiments, the disclosure can also be generally applied to quality detection. Embodiments can be generally applied to determining quality of parts based on different types of data.

FIG. 2 illustrates a data set generator 272 (e.g., data set generator 172 of FIG. 1) to create data sets for a machine learning model (e.g., model 190 of FIG. 1), according to certain embodiments. In some embodiments, data set generator 272 is part of server machine 170 of FIG. 1. The data sets generated by data set generator 272 of FIG. 2 may be used to train a machine learning model (e.g., see FIG. 7D) to cause performance of a corrective action (e.g., see FIG. 7E).

Data set generator 272 (e.g., data set generator 172 of FIG. 1) creates data sets for a machine learning model (e.g., model 190 of FIG. 1). Data set generator 272 creates data sets using historical sensor data 244 (e.g., historical sensor data 144 of FIG. 1) and historical performance data 254 (e.g., historical performance data 154 of FIG. 1). System 200 of FIG. 2 illustrates data set generator 272, data inputs 210, and target output 220 (e.g., target data).

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set also includes mapping data that maps the data inputs 210 to the target outputs 220. Data inputs 210 are also referred to as "features," "attributes," or information." In some embodiments, data set generator 272 provides the data set to the training engine 182, validating engine 184, or testing engine 186, where the data set is used to train, validate, or test the machine learning model 190. Some embodiments of generating a training set are further described with respect to FIG. 7A.

In some embodiments, data set generator 272 generates the data input 210 and target output 220. In some embodiments, data inputs 210 include one or more sets of historical sensor data 244. In some embodiments, historical sensor data 244 includes one or more of sensor data from one or more types of sensors, combination of sensor data from one or more types of sensors, patterns from sensor data from one or more types of sensors, and/or the like.

In some embodiments, data set generator 272 generates a first data input corresponding to a first set of historical sensor data 244A to train, validate, or test a first machine learning model and the data set generator 272 generates a second data input corresponding to a second set of historical sensor data 244B to train, validate, or test a second machine learning model.

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical sensor data 244 to obtain a target output 220 (e.g., discrete historical performance data 254).

Data inputs 210 and target outputs 220 to train, validate, or test a machine learning model include information for a particular facility (e.g., for a particular substrate manufacturing facility). In some examples, historical sensor data 244 and historical performance data 254 are for the same manufacturing facility.

In some embodiments, the information used to train the machine learning model is from specific types of manufacturing equipment 124 of the manufacturing facility having specific characteristics and allow the trained machine learning model to determine outcomes for a specific group of manufacturing equipment 124 based on input for current parameters (e.g., current sensor data 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 is further trained, validated, or tested (e.g., current performance data 156 of FIG. 1) or adjusted (e.g., adjusting weights associated with input data of the machine learning model 190, such as connection weights in a neural network).

Figure 3:
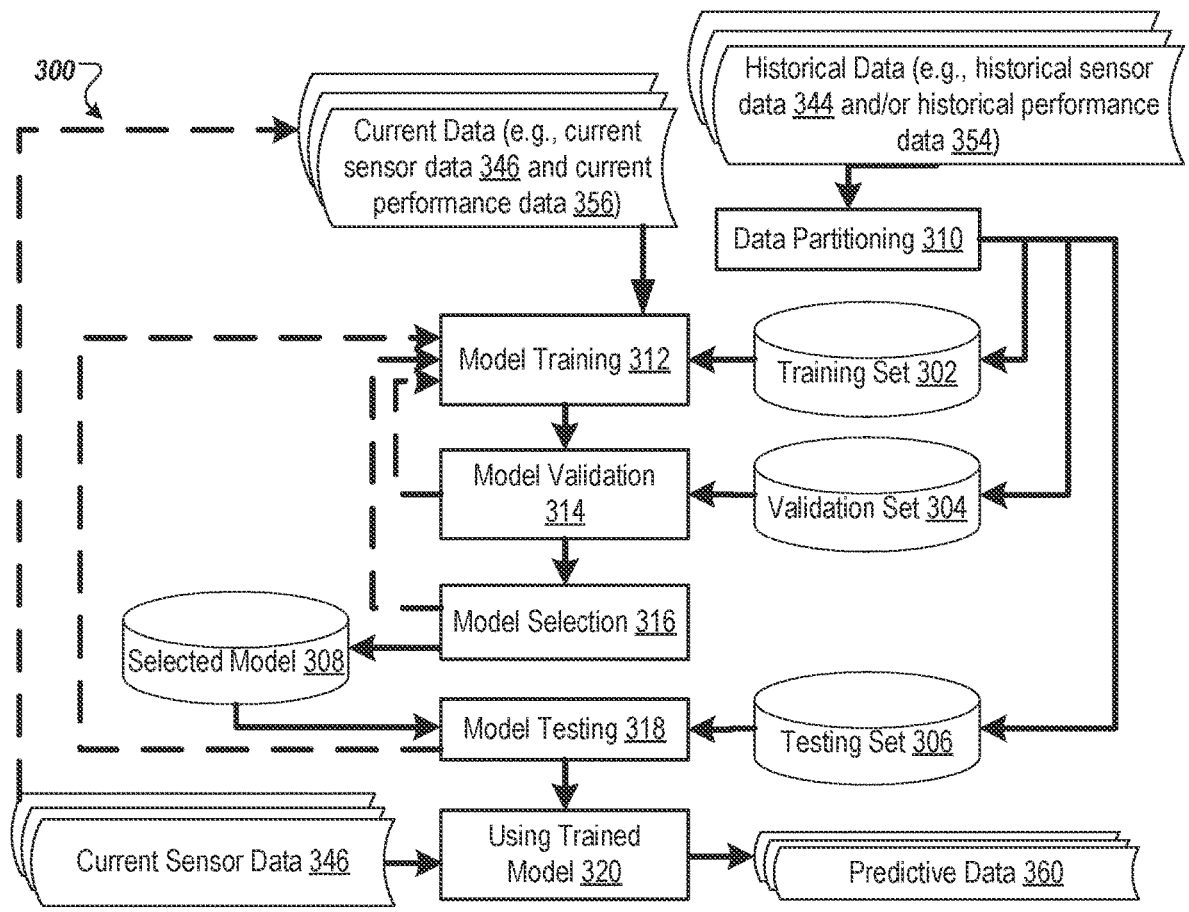
FIG. 3 is a block diagram illustrating determining predictive data, according to certain embodiments.

FIG. 3 is a block diagram illustrating a system 300 for generating predictive data 360 (e.g., predictive data 160 of FIG. 1), according to certain embodiments. The system 300 is used to determine predictive data 360 via a trained machine learning model (e.g., model 190 of FIG. 1) for edge defect detection (e.g., for performance of a corrective action).

At block 310, the system 300 (e.g., predictive system 110 of FIG. 1) performs data partitioning (e.g., via data set generator 172 of server machine 170 of FIG. 1) of the historical data (e.g., historical sensor data 344 and historical performance data 354 for model 190 of FIG. 1) to generate the training set 302, validation set 304, and testing set 306. In some examples, the training set is 60% of the historical data, the validation set is 20% of the historical data, and the testing set is 20% of the historical data. The system 300 generates a plurality of sets of features for each of the training set, the validation set, and the testing set. In some examples, if the historical data includes features derived from 20 sensors (e.g., sensors 126 of FIG. 1) and 100 products (e.g., products that each correspond to sensor data from the 20 sensors), a first set of features is sensors 1-10, a second set of features is sensors 11-20, the training set is products 1-60, the validation set is products 61-80, and the testing set is products 81-100. In this example, the first set of features of the training set would be parameters from sensors 1-10 for products 1-60.

At block 312, the system 300 performs model training (e.g., via training engine 182 of FIG. 1) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set (e.g., sensor data from sensors 1-10 for products 1-60) and to generate a second trained machine learning model using the second set of features in the training set (e.g., sensor data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being sensor data from sensors 1-15 and second set of features being sensor data from sensors 5-20). In some embodiments, hundreds of models are generated including models with various permutations of features and combinations of models.

At block 314, the system 300 performs model validation (e.g., via validation engine 184 of FIG. 1) using the validation set 304. The system 300 validates each of the trained models using a corresponding set of features of the validation set 304. For example, system 300 validates the first trained machine learning model using the first set of features in the validation set (e.g., parameters from sensors 1-10 for products 61-80) and the second trained machine learning model using the second set of features in the validation set (e.g., parameters from sensors 11-20 for products 61-80). In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 tests, using the first set of features in the testing set (e.g., sensor data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., sensor data from different sensors). Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions.

At block 320, system 300 uses the trained model (e.g., selected model 308) to receive current sensor data 346 (e.g., current sensor data 146 of FIG. 1) and determines (e.g., extracts), from the trained model, predictive data 360 (e.g., predictive data 160 of FIG. 1) for edge defect detection to perform a corrective action. In some embodiments, the current sensor data 346 corresponds to the same types of features in the historical sensor data 344. In some embodiments, the current sensor data 346 corresponds to a same type of features as a subset of the types of features in historical sensor data 344 that is used to train the selected model 308.

In some embodiments, current data is received. In some embodiments, current data includes current performance data 356 (e.g., current performance data 156 of FIG. 1) and/or current sensor data 346. In some embodiments, at least a portion of the current data is received from metrology equipment (e.g., metrology equipment 128 of FIG. 1) or via user input. In some embodiments, the model 308 is re-trained based on the current data. In some embodiments, a new model is trained based on the current performance data 356 and the current sensor data 346.

In some embodiments, one or more of the blocks 310-320 occur in various orders and/or with other operations not presented and described herein. In some embodiments, one or more of blocks 310-320 are not be performed. For example, in some embodiments, one or more of data partitioning of block 310, model validation of block 314, model selection of block 316, and/or model testing of block 318 are not be performed.

Figure 4A:
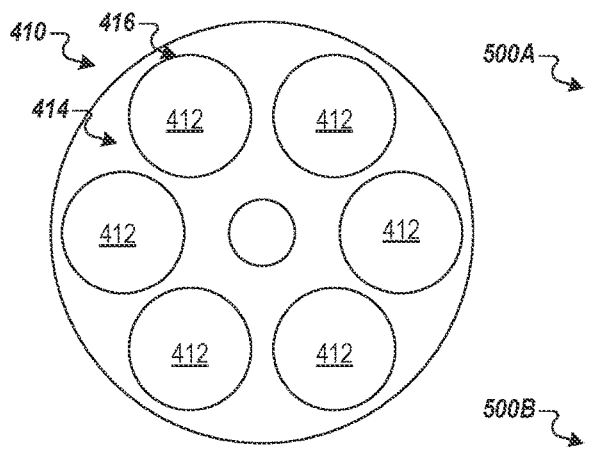
FIGS. 4A-C illustrate substrate processing equipment parts, according to certain embodiments.
Figure 4B:
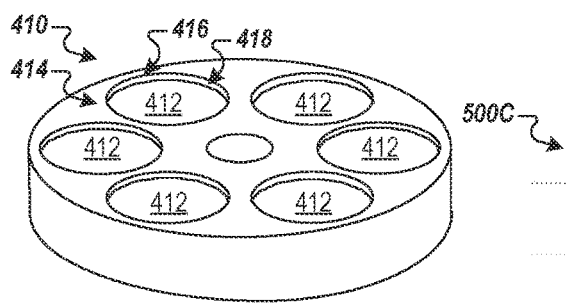
Figure 4C:
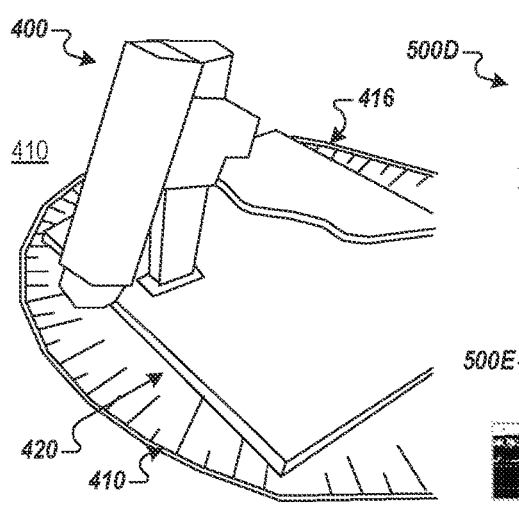

FIGS. 4A-C illustrate substrate processing equipment parts 410, according to certain embodiments. FIG. 4A is a top view of a substrate processing equipment part 410, FIG. 4B is a perspective view of a substrate processing equipment part 410, and FIG. 4C is a perspective view of a substrate processing equipment part 410 and an image capturing device 400.

The substrate processing equipment part 410 may be a showerhead, a susceptor, edge ring, electrostatic chuck, etc. In some embodiments, the substrate processing equipment part 410 is cylindrical (e.g., circular perimeter). In some embodiments, an upper surface 414 of the substrate processing equipment part 410 forms one or more recesses 412 (e.g., susceptor pockets, wafer pockets, susceptor pockets). In some embodiments, the upper surface 414 of the substrate processing equipment part 410 forms two or more recesses 412 (e.g., two or more susceptor pockets). In some embodiments, the upper surface of the substrate processing equipment part 410 forms three or more recesses 412 (e.g., three or more susceptor pockets). In some embodiments, the upper surface of the substrate processing equipment part 410 forms four or more recesses 412 (e.g., four or more susceptor pockets). In some embodiments, the upper surface of the substrate processing equipment part 410 forms five or more recesses 412 (e.g., five or more susceptor pockets). In some embodiments, the upper surface of the substrate processing equipment part 410 forms six or more recesses 412 (e.g., six or more susceptor pockets).

Each recess 412 (e.g., pocket) may be further formed by one or more sidewalls 418 and a lower wall. Each recess 412 may be formed by a sidewall 418 that has a substantially circular perimeter and a substantially vertical height. The sidewall 418 may be substantially perpendicular (e.g., 90-95 degrees, 90-100 degrees, 95-100 degrees, etc.) to the lower wall and/or the upper surface 414. Each recess 412 may be formed by a lower wall that is substantially planar, is substantially parallel to the upper surface 414 of the substrate processing equipment part 410, and/or is substantially perpendicular (e.g., 90-95 degrees, 90-100 degrees, 95-100 degrees, etc.) to the sidewall 418. The sidewall 418 and the upper surface 414 may meet at an edge 416 (e.g., upper edge, circular edge). The sidewall 418 and the lower surface may meet at a lower edge. Defects in the edge 416 (e.g., upper edge where the sidewall 418 and the upper surface 414 meet) may cause defects in the substrates produced via substrate processing equipment part 410.

The substrate processing equipment part 410 may be configured to receive a substrate (e.g., a substrate that has a circular perimeter) in a recess 412 for performing of a substrate processing operation. The substrate processing equipment part 410 may be disposed in a processing chamber that is configured to perform one or more substrate processing operations. The substrate processing equipment part 410 and/or one or more portions of the processing chamber may rotate relative to each other so that different substrate processing operations can be performed on a substrate disposed in a recess 412. The recesses 412 (e.g., and substrates disposed in the recesses 412) may be separated from each other by a barrier (e.g., air curtain, partition, etc.).

Referring to FIG. 4C, an angle identification component 420 (e.g., protector) may be disposed in the recess 412 formed by the substrate processing equipment part 410 (e.g., protector may be placed on top of susceptor pocket to define the angels across the circumference edge). An image capturing device 400 may be used to capture images (e.g., sensor data 142) of the angle identification component 420 and an edge 416 (e.g., where sidewall 418 and upper surface 414 meet) of the substrate processing equipment part 410 (e.g., susceptor) that forms the recess 412 (e.g., susceptor pocket).

The angle identification component 420 may have markings (e.g., every degree, every five degrees, etc.). The angle identification component 420 may be a protector that is placed on top of the susceptor pocket to properly define angles across the circumference edge. The image capturing device 400 may include a light (e.g., light emitting diode (LED)), a diffusor (e.g., a white diffusor), and a camera configured to capture input images at constant angular intervals. In some embodiments, the image capturing device 400 captures a video and the images are derived from the video.

In some embodiments, the image capturing device 400 is moved (e.g., manually moved) to different locations to capture images. In some embodiments, the image capturing device 400 is includes an actuation device (e.g., motor) that moves the camera (e.g., is automatically moved) to different locations to capture images.

FIGS. 5A-E illustrate images 500A-E of substrate processing equipment parts 510 (e.g., substrate processing equipment parts 410 of FIGS. 4A-C), according to certain embodiments.

Figure 5A:
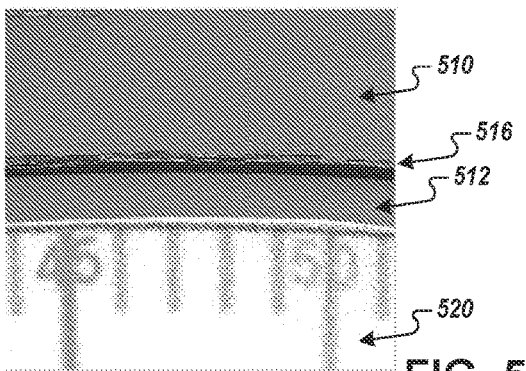
FIGS. 5A-E illustrate images of substrate processing equipment parts, according to certain embodiments.

Referring to FIG. 5A, an image 500A (e.g., raw image, original input image) may be captured. The image may be captured by placing an angle identification component 520 (e.g., angle identification component 420 of FIG. 4C) on or in the recess 512 (e.g., susceptor pocket) to properly define the angles across the circumference edge. A light (e.g., LED) with a diffusor (e.g., white diffusor) and camera may be used to capture input images (e.g., still images and/or video) at constant angular intervals.

The image 500A may include at least a predetermined amount of markings (e.g., at least 5 degrees) of the angle identification component 520. The image 500A may include an edge 516 (e.g., where sidewall and upper surface meet) of the sidewall 418 that forms the recess 512 (e.g., recess 412 of FIGS. 4A-C, susceptor pocket).

Figure 5B:
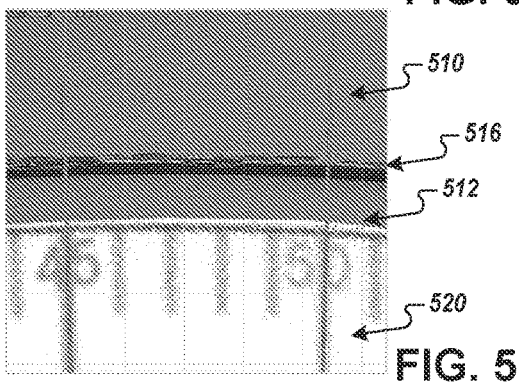

Referring to FIG. 5B, image 500B may be image 500A that has been processed. The image 500A may be converted into grayscale to generate image 500B. The vertical and horizontal cropping window may highlight the edge in grayscale.

Figure 5C:
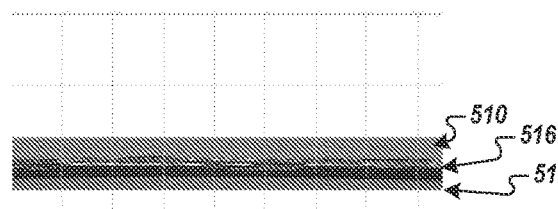

Referring to FIG. 5C, image 500C (e.g., cropped image in grayscale) may be image 500A and/or image 500B that has been processed. A dynamic bi-directional cropping may be applied to image 500B to obtain a particular region (e.g., edge of the susceptor) in the image within a given angular interval (e.g., 5 degrees).

Figure 5D:
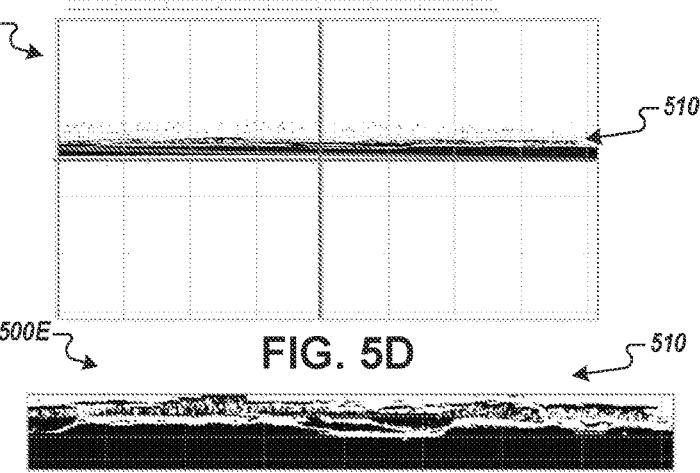

Referring to FIG. 5D, image 500D may be image 500A, image 500B, and/or image 500C that has been processed. Image 500D may be a threshold image after preliminary cropping. The lines in image 500D may mark the asymmetry of the image 500D with respect to a center line. For edge segmentation, an adaptive thresholding may be applied based on a predetermined grid size (e.g., optimized grid size) for conversion to a binary image (e.g., has black pixels and white pixels only). To eliminate the background distortion, contour detection may be applied. The contours with smaller area may be eliminated. For finer assessment, additional smoothening of the background may be performed to highlight the edge of the susceptor. Smoothening may include reducing the size of a shape that smaller than a threshold size (e.g., small dot) to detach the shape from the edge so that the shape can be removed.

Figure 5E:

Referring to FIG. 5E, image 500E may be image 500A, image 500B, image 500C, and/or image 500D that has been processed. Image 500E may be a final cropped image after removing the background distortion and smoothening the background. In image 500E, the distribution of the pixel highlighting the edge crack may be used to perform dynamic rotation (e.g., to make the image symmetric) and final cropping may be performed.

FIGS. 6A-D illustrate images 600 of substrate processing equipment parts 610 (e.g., substrate processing equipment parts 410 of FIGS. 4A-C, substrate processing equipment parts 510 of FIGS. 5A-E), according to certain embodiments.

FIGS. 6A-C may be binary images. In a binary image, the white pixels may highlight the contours of edge defects. In some embodiments, linear scaling is applied to convert the pixels into metric units (e.g., millimeters (mm)). A total number of whit images may be calculated to analyze the edge (e.g., impaired area). The total vertical height of the image may indicate extended height of the edge due to cracks. The "good" or "bad" classification may be performed by the counts (e.g., quantity) of the white pixel and comparing the extended height to the standard height of the edge. The entire process may be repeated for each pocket of the susceptor for all possible angular intervals.

Referring to FIG. 6A, image 600A may be of a substrate processing equipment part 610 that has an edge that has property values that meet threshold values (e.g., the substrate processing equipment part has a "good" classification). Image 600A may show the standard reference height and a lower number of white pixels on the top. A height of image 600A may not meet threshold height (e.g., the height is less than a height that indicates an edge defect). A quantity of white pixels of image 600A may not meet a threshold amount (e.g., the quantity of white pixels is less than an amount of white pixels that indicates an edge defect).

Referring to FIG. 6B, image 600B may be of a substrate processing equipment part 610 that has an edge that has property values that do not meet threshold values (e.g., the substrate processing equipment part has a "good" classification). Image 600B may have an extended height and a higher number of white pixels on the top. A height of image 600B may meet a threshold height (e.g., the height is equal to or greater than a height that indicates an edge defect). A quantity of white pixels of image 600B may meet a threshold amount (e.g., the quantity of white pixels is equal to or greater than an amount of white pixels that indicates an edge defect).

Referring to FIG. 6C, image 600C may be of a substrate processing equipment part 610 that has an edge that has property values that do not meet threshold values. A height 604 of image 600C meets a threshold height (e.g., is greater than a height of a susceptor edge that produces substrates that have performance data that meets threshold values). An amount of a type of pixels 602 (e.g., white pixels) meets a threshold amount (e.g., amount of white pixels denoting the area of the edge crack are greater than an amount of white pixels of a susceptor edge that produces substrates that have performance data that meets threshold values).

Referring to FIG. 6D, image 600D may be of substrate processing equipment part 610. The substrate processing equipment part 610 may include an upper surface 614 that forms one or more recesses 612 (e.g., susceptor pockets). The recess 612 may be formed by a sidewall 618 and a lower surface. Where the sidewall 618 and the upper surface 614 meet may be an edge 616 (e.g., upper edge).

A distance 620, distance 630, and/or distance 640 may be measured for substrate processing equipment part 610. Boundary bottom 632 (of distance 630) may be a lower edge where the lower surface and the sidewall 618 meet. Boundary top 622 (of distance 620) and boundary bottom 624 (of distance 620) may form the boundary between the sidewall 618 and the upper surface 614 of the substrate processing equipment part 610. Edge defects (e.g., cracked edge) at the top of the edge 616 cause the x-distance 620 (e.g., height of the edge crack) to increase, cause the distance 640 (e.g., width of the edge crack) to increase, and cause the distance 630 (e.g., distance between the boundary bottom 632 of distance 630 and boundary bottom 624 of distance 620) to decrease. The height 604 may be the sum of the distance 620 and the distance 630.

In some embodiments, the height 604 is determined via automation (e.g., via processing logic). In some embodiments, the automated height of the edge 616 is compared with a manually calculated width (e.g., distance 620, (distance 620+distance 630)−distance 630)) of the edge 616.

FIGS. 7A-E are flow diagrams of methods 700A-E associated with edge defect detection according to certain embodiments. In some embodiments, methods 700A-E are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 700A-E are performed, at least in part, by predictive system 110 and/or client device 120. In some embodiments, method 700A is performed, at least in part, by predictive system 110 (e.g., server machine 170 and data set generator 172 of FIG. 1, data set generator 272 of FIG. 2). In some embodiments, predictive system 110 uses method 700A to generate a data set to at least one of train, validate, or test a machine learning model. In some embodiments, methods 700B-C are performed by client device 120. In some embodiments, method 700D is performed by server machine 180 (e.g., training engine 182, etc.). In some embodiments, method 700E is performed by predictive server 112 (e.g., predictive component 114). In some embodiments, method 700C is performed by client device 120 (e.g., corrective action component 122). In some embodiments, a non-transitory storage medium stores instructions that when executed by a processing device (e.g., of predictive system 110, of server machine 180, of predictive server 112, etc.), cause the processing device to perform one or more of methods 700A-E.

For simplicity of explanation, methods 700A-E are depicted and described as a series of operations. However, operations in accordance with this disclosure can occur in various orders and/or concurrently and with other operations not presented and described herein. Furthermore, in some embodiments, not all illustrated operations are performed to implement methods 700A-E in accordance with the disclosed subject matter. In addition, those skilled in the art will understand and appreciate that methods 700A-E could alternatively be represented as a series of interrelated states via a state diagram or events.

In some embodiments, one or more of methods 700A-E are used to one or more of discriminate between good and bad parts, eliminate human inspection and human judgement about end of part life, determine end of life of a susceptor, identify patterns of crack location and use to improve coating (e.g., silicon carbide (SiC)) process, correlate occurrence of cracks to deposition conditions and use to move process window to a regime that lessens cracks, detect cracks within a threshold accuracy, and/or the like.

Figure 7A:
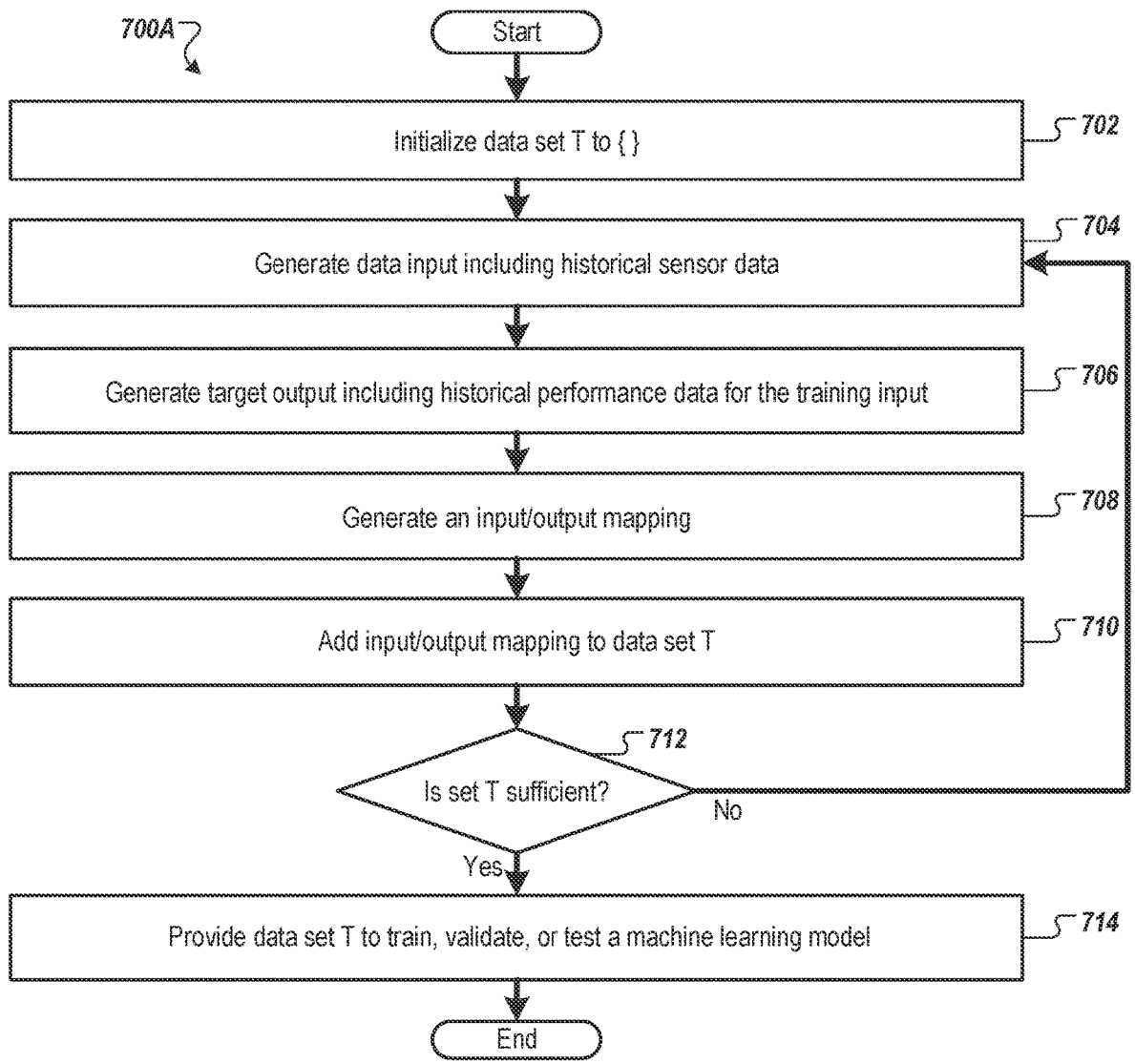
FIGS. 7A-E are flow diagrams of methods associated with edge defect detection, according to certain embodiments.

FIG. 7A is a flow diagram of a method 700A for generating a data set for a machine learning model for generating predictive data (e.g., predictive data 160 of FIG. 1), according to certain embodiments.

Referring to FIG. 7A, in some embodiments, at block 702 the processing logic implementing method 700A initializes a training set T to an empty set.

At block 704, processing logic generates first data input (e.g., first training input, first validating input) that includes sensor data (e.g., historical sensor data 144 of FIG. 1, historical sensor data 244 of FIG. 2, etc.). In some embodiments, the first data input includes a first set of features for types of sensor data and a second data input includes a second set of features for types of sensor data (e.g., as described with respect to FIG. 2).

At block 706, processing logic generates a first target output for one or more of the data inputs (e.g., first data input). In some embodiments, the first target output is historical performance data (e.g., historical performance data 154 of FIG. 1, historical performance data 254 of FIG. 2).

At block 708, processing logic optionally generates mapping data that is indicative of an input/output mapping. The input/output mapping (or mapping data) refers to the data input (e.g., one or more of the data inputs described herein), the target output for the data input (e.g., where the target output identifies historical performance data 154), and an association between the data input(s) and the target output.

At block 710, processing logic adds the mapping data generated at block 708 to data set T.

At block 712, processing logic branches based on whether data set T is sufficient for at least one of training, validating, and/or testing machine learning model 190 (e.g., uncertainty of the trained machine learning model meets a threshold uncertainty). If so, execution proceeds to block 714, otherwise, execution continues back to block 704. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 714, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/output mapping are stored in the output nodes of the neural network. The connection weights in the neural network are then adjusted in accordance with a learning algorithm (e.g., back propagation, etc.), and the procedure is repeated for the other input/output mappings in data set T.

After block 714, machine learning model (e.g., machine learning model 190) can be at least one of trained using training engine 182 of server machine 180, validated using validating engine 184 of server machine 180, or tested using testing engine 186 of server machine 180. The trained machine learning model is implemented by predictive component 114 (of predictive server 112) to generate predictive data (e.g., predictive data 160) for edge defect detection to cause performance of a corrective action.

Figure 7B:
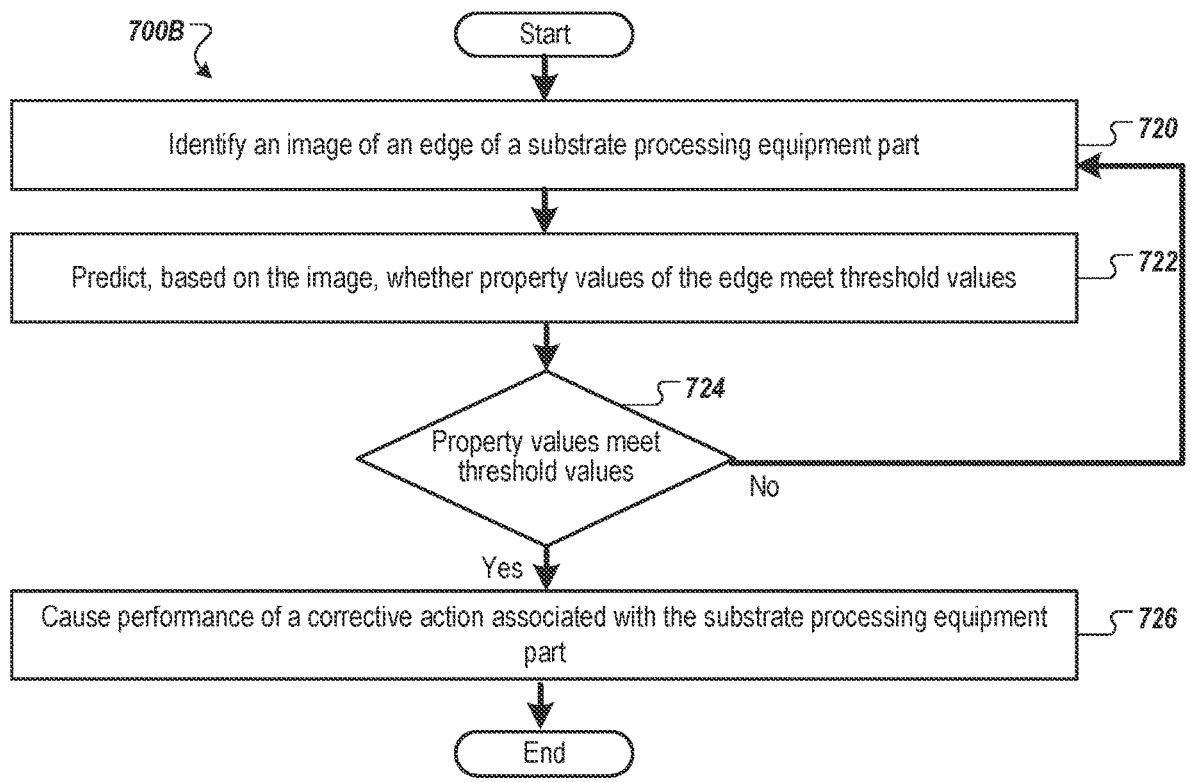

FIG. 7B is a method 700B associated with edge defect detection via image analytics, according to certain embodiments. In some embodiments, method 700B is performed before and after cleaning of a substrate processing equipment part. Via method 700B, processing logic may dynamically detect the edge of a susceptor pocket from a digital image and the processing logic may evaluate the height and edge characteristics to further classify the edge of the susceptor pocket as meeting a threshold condition (e.g., being a good or bad condition).

At block 720 of method 700B, the processing logic identifies an image of an edge of a substrate processing equipment part (e.g., substrate processing equipment part 410 of FIG. 4A-C). The substrate processing equipment part may be a susceptor, edge ring, electrostatic chuck, etc.

In some embodiments, the processing logic receives the image from an image capturing device (e.g., image capturing device 400 of FIG. 4C). An angle identification component (e.g., angle identification component 420 of FIG. 4C) may be placed in or on a recess formed by a substrate processing equipment part (e.g., susceptor pocket formed by a susceptor). The image capturing device may cause light to be projected (e.g., emitted via a LED light with a white diffusor) onto the edge of the substrate processing equipment part and the angle identification component. A camera of the image capturing device may capture images at constant angular intervals of the edge and the angle identification component. In some embodiments, the image capturing device may capture a video that includes the images.

At block 722, the processing logic predicts, based on the image, whether property values of the edge meet threshold values. The processing logic may perform one or more of the blocks of method 700C of FIG. 7C, method 700D of FIG. 7D, and/or method 700E of FIG. 7E to predict whether the property values of the edge meet threshold values.

In some embodiments, the property values include one or more of height of the edge, quantity of pixels associated with a deformation of the edge, etc. The threshold values may be indicative of a substrate processing equipment part that is predicted to produce substrates that do not have performance data that meet threshold values (e.g., have defects). The threshold values may be indicative of a substrate processing equipment part that is to undergo a corrective action (e.g., cleaning, repair, replacement, etc.) to produce substrates that have performance data that meet threshold values (e.g., good wafers).

The processing logic may determine location (e.g., angular position of the defect present at the circumference of the pocket), size (e.g., height of the defect present at the circumference of the pocket), and/or quantity of defects on the edge (e.g., wafer pocket).

At block 724, responsive to the property values meeting threshold values, flow continues to block 726. At block 724, responsive to property values not meeting threshold values, flow continues to block 720 where a subsequent image of an edge of the substrate processing equipment part is identified and method 700B is repeated.

At block 726, processing logic causes performance of a corrective action associated with the substrate processing equipment part. The corrective action may include one or more of providing an alert, causing a cleaning action, causing a repairing action, causing replacement, determining a predicted end of life of the substrate processing equipment part, etc.

Blocks 720-726 may be repeated until the property values of each of the edges meet threshold values. In some embodiments, based on the number of corrective actions (e.g., cleaning cycles) until the property values of the edge of the substrate processing equipment part meet threshold values, the processing logic may predict end of life of the substrate processing equipment part.

Figure 7C:
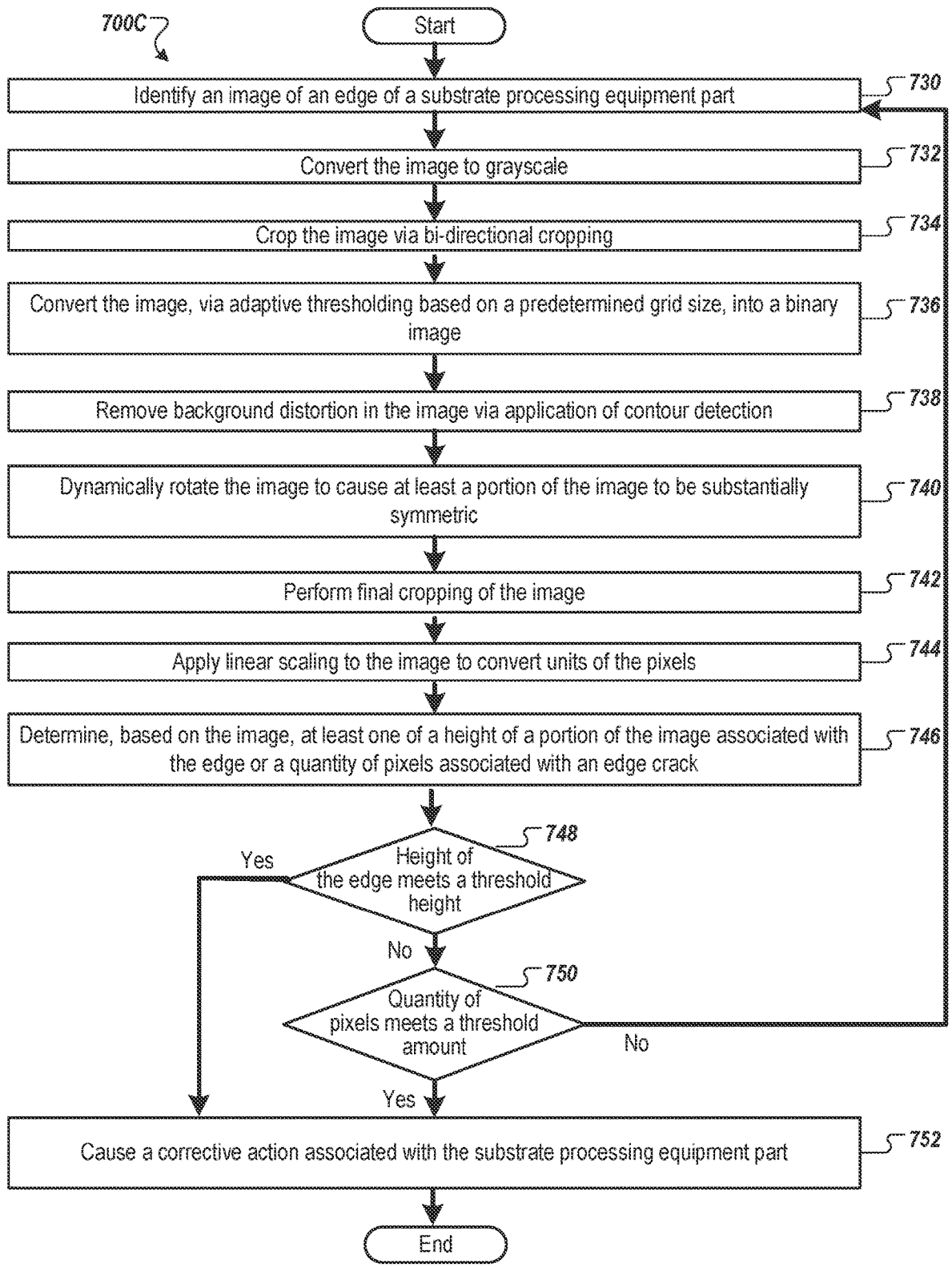

FIG. 7C is a method associated with edge defect detection via image analytics, according to certain embodiments. In some embodiments, method 700B is performed before and after cleaning of a substrate processing equipment part.

At block 730, processing logic identifies an image of an edge of a substrate processing equipment part (e.g., see FIG. 5A). Block 730 of FIG. 7C may be similar to block 720 of FIG. 7B.

At block 732, processing logic converts the image to grayscale (e.g., see FIG. 5B). In some embodiments, the image is captured in grayscale.

At block 734, processing logic crops the image via bi-directional cropping (e.g., see FIGS. 5B-C). A dynamic bi-directional cropping may be applied to obtain a region (e.g., edge of the susceptor) of the image within a predetermined angular interval (e.g., five degrees).

At block 736, processing logic converts the image, via adaptive thresholding based on a predetermined grid size (e.g., optimized grid size) into a binary image (e.g., for edge segmentation). The binary image may only include black pixels and white pixels.

In some embodiments, the processing logic applies threshold pixel values to the image. In some embodiments, the pixel format of the image is a byte image where a pixel value is a number stored as an 8-bit integer giving a range of possible values from 0 to 255, where 0 is black and 255 is white. The processing logic may convert all pixel values above a threshold pixel value (e.g., 200) to white (e.g., pixel value of 255) and may convert all pixel values below a threshold pixel value (e.g., 200) to be black (e.g., a pixel value of 0). This may remove gray pixel values from the image.

At block 738, processing logic removes background distortion in the image via application of contour detection. Contours with smaller areas (e.g., area less than a threshold value) may be eliminated. For finder assessment, additional smoothening of the background may be performed to highlight the edge of the substrate processing equipment part. Smoothening may include reducing the size of a shape that smaller than a threshold size (e.g., small dot) to detach the shape from the edge so that the shape can be removed (e.g., via removing of background distortions in block 738).

In some embodiments, the centroid of the edge in the y-direction is determined. If a contour is a threshold distance away from the centroid, the processing logic may remove the contour.

At block 740, processing logic dynamically rotates the image to cause at least a portion of the image to be substantially symmetric (e.g., FIG. 5D). The image may be rotated so that the bottom-left black pixels of the image and the bottom-right black pixels of the image are symmetrical around a center line.

At block 742, processing logic performs final cropping of the image. The final cropping may be performed after removing the background distortion and smoothening the background.

At block 744, processing logic applies linear scaling to the image to convert units of the pixels (e.g., convert the pixel into metric units, such as millimeters). The white pixels may highlight the contours occupied edge defects.

At block 746, processing logic determines, based on the image, at least one of a height (e.g., height 604 of FIG. 6C) of a portion of the image associated with the edge or a quality of pixels (e.g., pixels 602 of FIG. 6C) associated with an edge crack. The total number of white pixels may be calculated to analyze the area that is impaired (e.g., edge defects). The total vertical height of the image may indicate the extended height of the edge due to cracks. "Good" or "bad" classification can be performed by the counts of the white pixel and comparing the extended height to the standard height of the edge.

At block 748, processing logic determines whether height of the edge meets a threshold height. Responsive to the height of the edge meeting a threshold height, flow continues to block 752. Responsive to the height of the edge not meeting the threshold height, flow continues to block 750.

At block 750, processing logic determines whether quantity of pixels meets a threshold amount. Responsive to the quantity of pixels meeting a threshold height, flow continues to block 752. Responsive to the height of the edge not meeting the threshold height, flow continues to block 730. Method 700C may be repeated for each pocket of the substrate processing equipment part (e.g., susceptor) for all angular intervals (e.g., each 5 degree interval around the edge).

At block 752, processing logic causes performance of a corrective action associated with the substrate processing equipment part. Block 752 of FIG. 7C may be similar to block 726 of FIG. 7B.

Figure 7D:
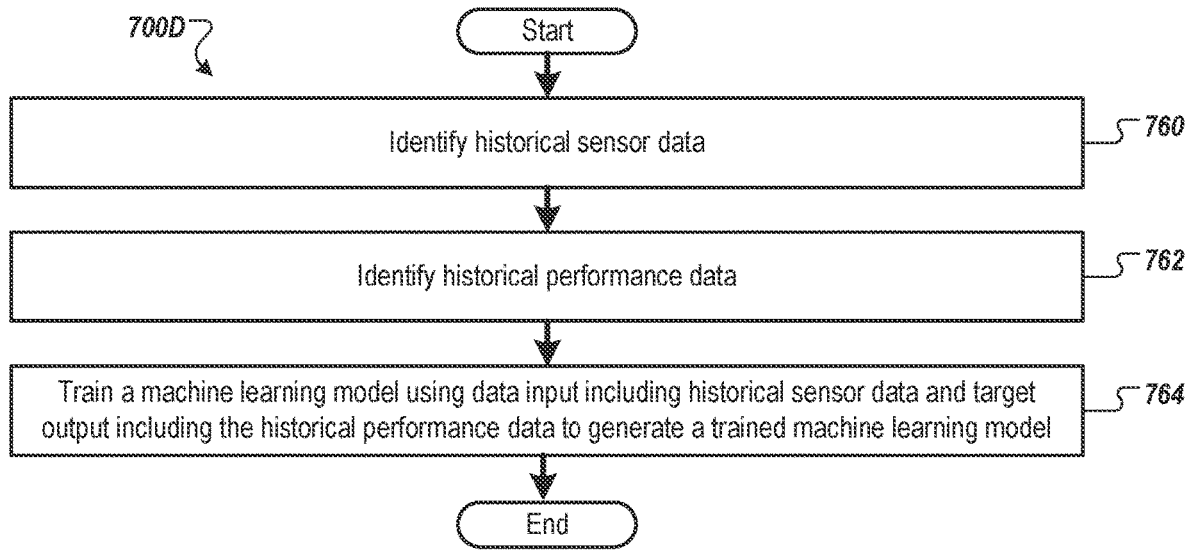

FIG. 7D is a method for training a machine learning model (e.g., model 190 of FIG. 1) for determining predictive data (e.g., predictive data 160 of FIG. 1) for edge defect detection via image analytics.

Referring to FIG. 7D, at block 760 of method 700D, the processing logic identifies historical sensor data (e.g., historical sensor data 144 of FIG. 1, historical input sensor data). The historical sensor data may include historical images of edges of substrate processing equipment. The historical images may have been processed by one or more of the operations of method 700C of FIG. 7C (e.g., processed via one or more of blocks 732-744).

In some embodiments, a network of available images of substrate processing equipment parts are available. In some embodiments, a second portion of the images are of substrate processing equipment parts that have property values that meet threshold values (e.g., bad susceptor images with broken edge, see FIGS. 6B-C). In some embodiments, a first portion of the images are of substrate processing equipment parts that have property values that do not meet threshold values (e.g., good susceptor images, see FIG. 6A).

At block 762, the processing logic identifies historical performance data (e.g., historical performance data 154 of FIG. 1, historical output performance data). At least a portion of the historical sensor data and the historical performance data may be associated with new substrate processing equipment parts (e.g., used for benchmarking). The historical performance data may be an indication of whether the property values of the substrate processing equipment part meet threshold values. The historical performance data may be an indication of whether the substrate processing equipment part is new. The historical performance data may be an indication of whether the substrate processing equipment part is defective. The historical performance data may be an indication of whether performance data (e.g., property values, amount of defects, etc.) of substrates produced by the substrate processing equipment part meet threshold values (e.g., good wafers or bad wafers).

At block 764, the processing logic trains a machine learning model using data input including historical sensor data and target output including the historical performance data to generate a trained machine learning model.

In some embodiments, the processing logic (e.g., via trained machine learning model) correlates chamber wafer performance (e.g., defects, uniformity, etc.) to quantified defects on the susceptor. Defect size and location may be compared and tracked (e.g., via digital records) between cleaning operations, between susceptors, and/or to identify potential issue areas on the substrate processing equipment part correlating to chamber design and/or process condition. In some examples, if the substrates have substrate defects proximate the same location as the edge defect of the substrate processing equipment part, then a corrective action is to be performed.

In some embodiments, the historical sensor data of block 760 includes historical images of historical substrate processing equipment parts and the historical performance data of block 762 corresponds to historical substrate processing equipment parts. The historical performance data may be associated with substrate quality, such as metrology data of substrates, substrate throughput, substrate defects, etc. The historical performance data may be associated with quality of the substrate processing equipment part, such as manual inspection, metrology data of the substrate processing equipment part, time of failure of substrate processing equipment part, etc. At block 764, the machine learning model may be trained using data input including the historical images and target output including the historical performance data to generate a trained machine learning model configured to predict whether property values of the substrate processing equipment part meet threshold values. At block 722 of FIG. 7B, processing logic may use the trained machine learning model trained via method 700D of FIG. D to determine whether the property values meet the threshold values.

Figure 7E:
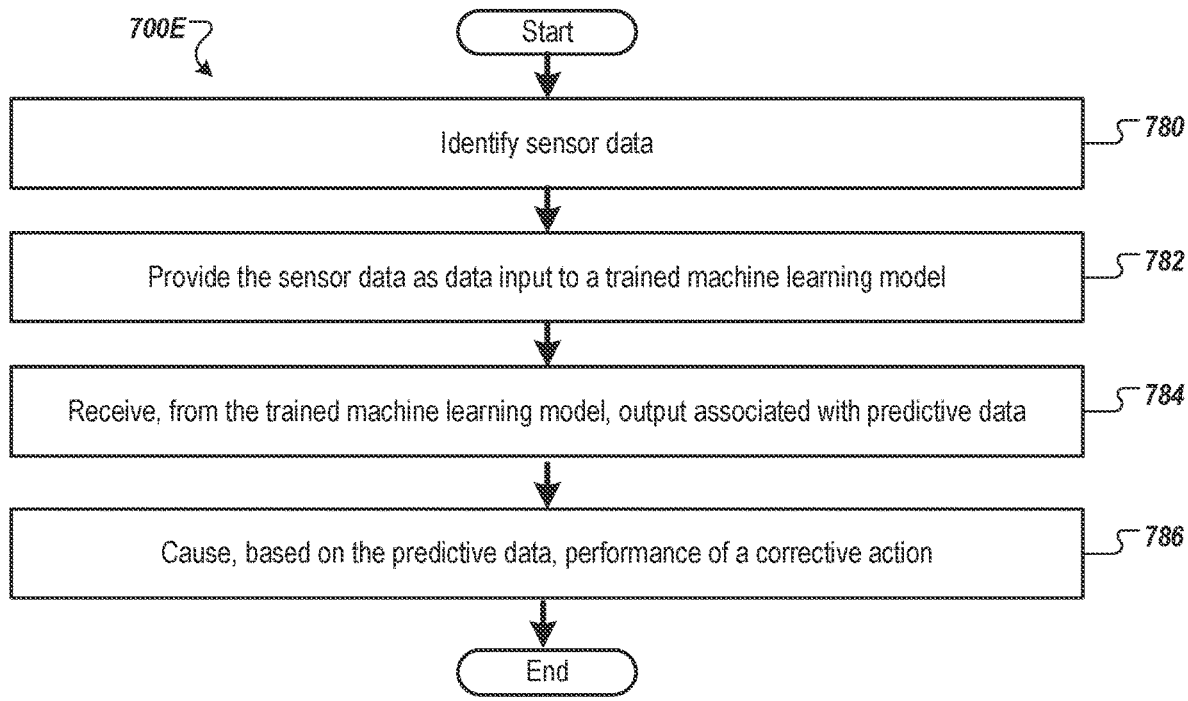

FIG. 7E is a method 700E for using a trained machine learning model (e.g., model 190 of FIG. 1) for edge defect detection to cause performance of a corrective action.

Referring to FIG. 7E, at block 780 of method 700E, the processing logic identifies sensor data. In some embodiments, the sensor data of block 780 includes an image of a substrate processing equipment part. Block 780 of FIG. 7E may be similar to block 720 of FIG. 7B.

At block 782, the processing logic provides the sensor data as data input to a trained machine learning model (e.g., trained via block 764 of FIG. 7D).

At block 784, the processing logic receives, from the trained machine learning model, output associated with predictive data.

At block 786, the processing logic causes, based on the predictive data, performance of a corrective action. Block 786 of FIG. 7E may be similar to block 726 of FIG. 7B.

Figure 8:
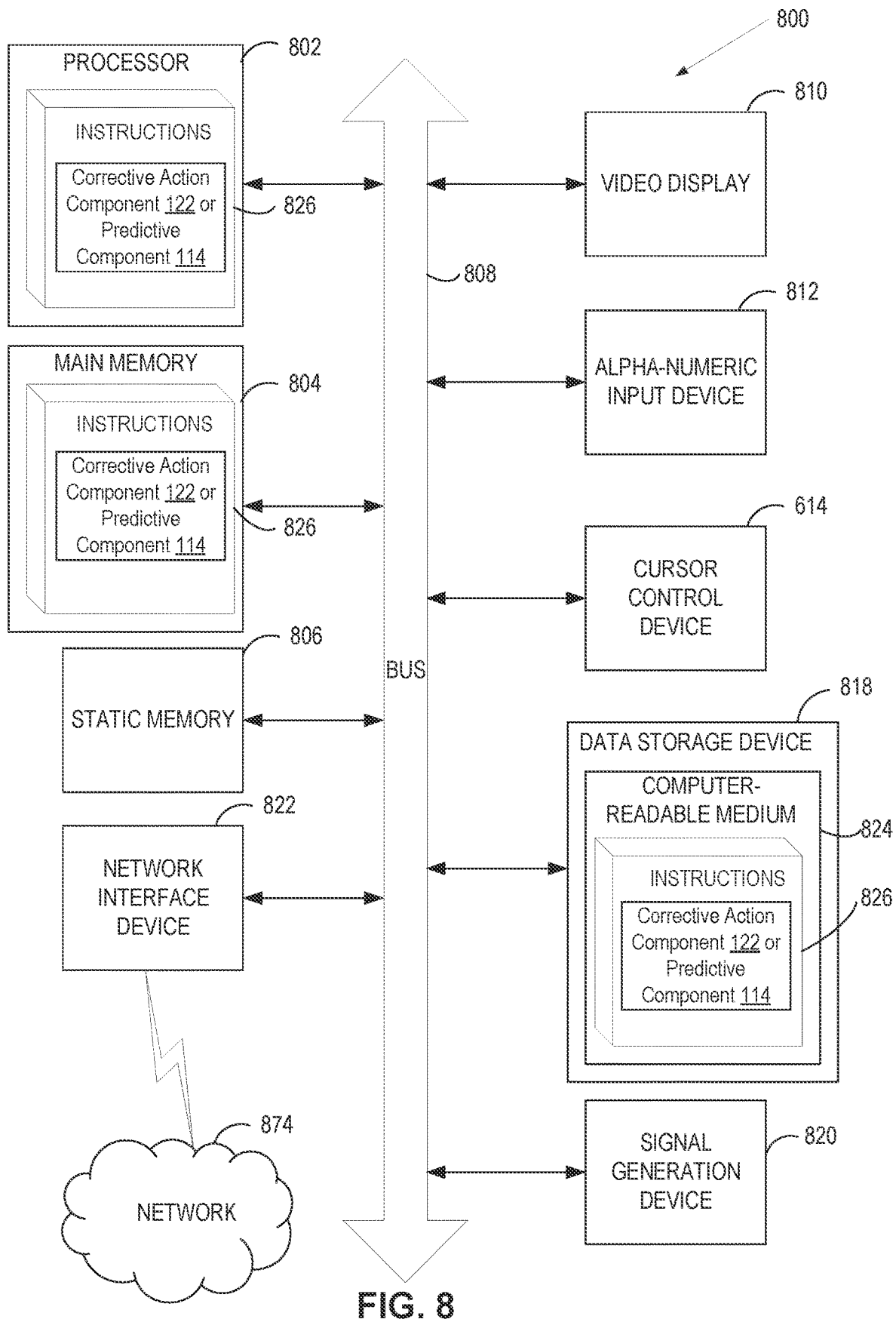
FIG. 8 is a block diagram illustrating a computer system, according to certain embodiments.

FIG. 8 is a block diagram illustrating a computer system 800, according to certain embodiments. In some embodiments, the computer system 800 is one or more of client device 120, predictive system 110, server machine 170, server machine 180, or predictive server 112.

In some embodiments, computer system 800 is connected (e.g., via a network, such as a Local Area Network (LAN), an intranet, an extranet, or the Internet) to other computer systems. In some embodiments, computer system 800 operates in the capacity of a server or a client computer in a client-server environment, or as a peer computer in a peer-to-peer or distributed network environment. In some embodiments, computer system 800 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 includes a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 816, which communicate with each other via a bus 808.

In some embodiments, processing device 802 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 800 further includes a network interface device 822 (e.g., coupled to network 874). In some embodiments, computer system 800 also includes a video display unit 810 (e.g., an LCD), an alphanumeric input device 812 (e.g., a keyboard), a cursor control device 814 (e.g., a mouse), and a signal generation device 820.

In some implementations, data storage device 816 includes a non-transitory computer-readable storage medium 824 on which store instructions 826 encoding any one or more of the methods or functions described herein, including instructions encoding components of FIG. 1 (e.g., corrective action component 122, predictive component 114, etc.) and for implementing methods described herein (e.g., one or more of methods 700A-E).

In some embodiments, instructions 826 also reside, completely or partially, within volatile memory 804 and/or within processing device 802 during execution thereof by computer system 800, hence, in some embodiments, volatile memory 804 and processing device 802 also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "identifying," "predicting," "causing," "capturing," "processing," "converting," "cropping," "thresholding," "removing,"

"rotating," "providing," "obtaining," "training," "further training," "re-training," "receiving," "determining," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

The methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying an image of an edge of a susceptor pocket formed in an upper surface of a susceptor of a substrate processing system;
   predicting, based on the image, whether property values of the edge of the susceptor meet threshold values, wherein the property values comprise at least one of a height of the edge or pixels associated with a deformation of the edge; and
   responsive to the property values of the edge meeting threshold values, causing performance of a corrective action associated with the susceptor.

2. The method of claim 1, wherein:
   the image is captured responsive to an angle identification component being disposed in the susceptor pocket and light being projected onto the edge and the angle identification component; and
   at least a portion of the angle identification component is in the image.

3. The method of claim 1 further comprising:
   capturing a video of the edge by moving an image capturing device along the edge; and
   processing the video to identify a plurality of images at predetermined angular intervals, the plurality of images comprising the image.

4. The method of claim 1, wherein the image is:
   converted to grayscale;
   cropped via dynamic bi-directional cropping; and
   converted, via adaptive thresholding based on a predetermined grid size, into a binary image comprising a first type of pixel and a second type of pixel, wherein the first type of pixel illustrates edge defects of the edge.

5. The method of claim 1, wherein at least a portion of background distortion in the image is removed via application of contour detection to the image.

6. The method of claim 1, wherein the image is dynamically rotated to cause at least a portion of the image to be substantially symmetric.

7. The method of claim 1, wherein the predicting whether the property values meet the threshold values comprises:
   providing the image as input to a trained machine learning model;
   obtaining, from the trained machine learning model, output associated with predictive data; and
   determining based on the predictive data whether the property values of the edge meet the threshold values.

8. The method of claim 7, the trained machine learning model being trained with input comprising historical images of historical susceptors and target output comprising historical performance data of the historical susceptors.

9. A non-transitory computer-readable storage medium storing instructions which, when executed, cause a processing device to perform operations comprising:
   identifying an image of an edge of a susceptor pocket formed in an upper surface of a susceptor of a substrate processing system;
   predicting, based on the image, whether property values of the edge of the susceptor meet threshold values, wherein the property values comprise at least one of a height of the edge or pixels associated with a deformation of the edge; and
   responsive to the property values of the edge meeting threshold values, causing performance of a corrective action associated with the susceptor.

10. The non-transitory computer-readable storage medium of claim 9, wherein:
    the image is captured responsive to an angle identification component being disposed in the susceptor pocket and light being projected onto the edge and the angle identification component; and
    at least a portion of the angle identification component is in the image.

11. The non-transitory computer-readable storage medium of claim 9, wherein the operations further comprise:
    capturing a video of the edge by moving an image capturing device along the edge; and
    processing the video to identify a plurality of images at predetermined angular intervals, the plurality of images comprising the image.

12. The non-transitory computer-readable storage medium of claim 9, wherein the image is:
    converted to grayscale;
    cropped via dynamic bi-directional cropping; and
    converted, via adaptive thresholding based on a predetermined grid size, into a binary image comprising a first type of pixel and a second type of pixel, wherein the first type of pixel illustrates edge defects of the edge.

13. The non-transitory computer-readable storage medium of claim 9, wherein:
    at least a portion of background distortion in the image is removed via application of contour detection to the image; and
    the image is dynamically rotated to cause at least a portion of the image to be substantially symmetric.

14. The non-transitory computer-readable storage medium of claim 9, wherein the predicting whether the property values meet the threshold values comprises:
    providing the image as input to a trained machine learning model;
    obtaining, from the trained machine learning model, output associated with predictive data; and
    determining based on the predictive data whether the property values of the edge meet the threshold values.

15. A system comprising:
    a memory; and
    a processing device coupled to the memory, the processing device to:
        identify an image of an edge of a susceptor pocket formed in an upper surface of a susceptor of a substrate processing system;
        predict, based on the image, whether property values of the edge of the susceptor meet threshold values, wherein the property values comprise at least one of a height of the edge or pixels associated with a deformation of the edge; and
        responsive to the property values of the edge meeting threshold values, cause performance of a corrective action associated with the susceptor.

16. The system of claim 15, wherein:
    the image is captured responsive to an angle identification component being disposed in the susceptor pocket and light being projected onto the edge and the angle identification component; and
    at least a portion of the angle identification component is in the image.

17. The system of claim 15, wherein the processing device is further to:
    capture a video of the edge by moving an image capturing device along the edge; and
    process the video to identify a plurality of images at predetermined angular intervals, the plurality of images comprising the image.

* * * * *